(No Model.)

W. N. GRAVES.
BRICK KILN.

No. 326,286. Patented Sept. 15, 1885.

Attest:
Charles Pickles
Geo. L. Wheelock

Inventor:
Willis N. Graves
By Knight Bros
attys

N. PETERS, Photo-Lithographer, Washington, D. C.

UNITED STATES PATENT OFFICE.

WILLIS N. GRAVES, OF ST. LOUIS, MISSOURI, ASSIGNOR OF ONE-HALF TO THE HYDRAULIC PRESS BRICK COMPANY, OF SAME PLACE.

BRICK-KILN.

SPECIFICATION forming part of Letters Patent No. 326,286, dated September 15, 1885.

Application filed January 22, 1885. (No model.)

*To all whom it may concern:*

Be it known that I, WILLIS N. GRAVES, of the city of St. Louis, in the State of Missouri, have invented a certain new and useful Improvement in Brick-Kilns, of which the following is a full, clear, and exact description, reference being had to the accompanying drawings, forming part of this specification, in which—

Figure 1:
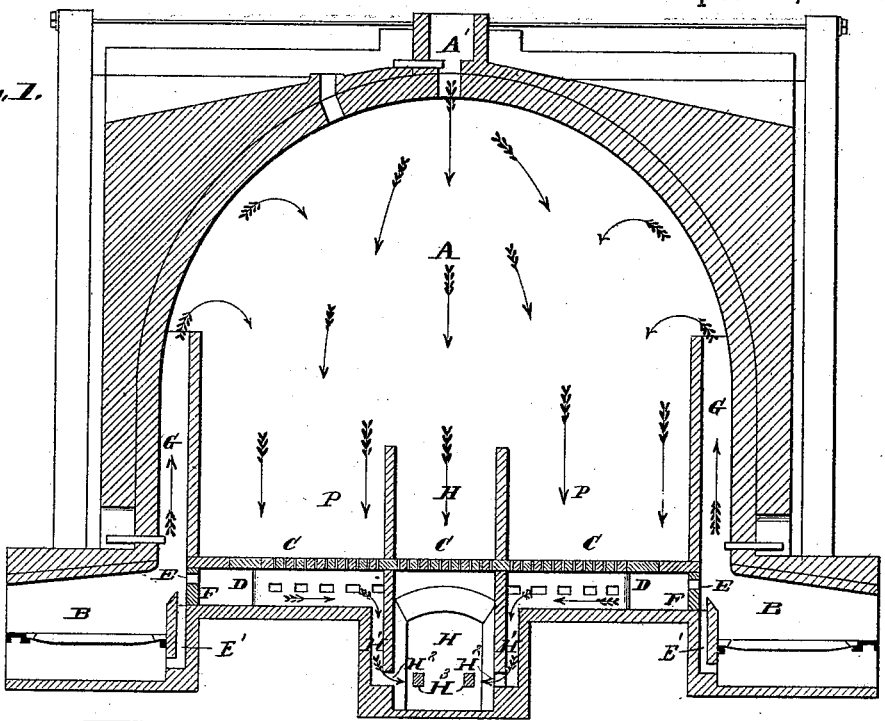
Figure 2:
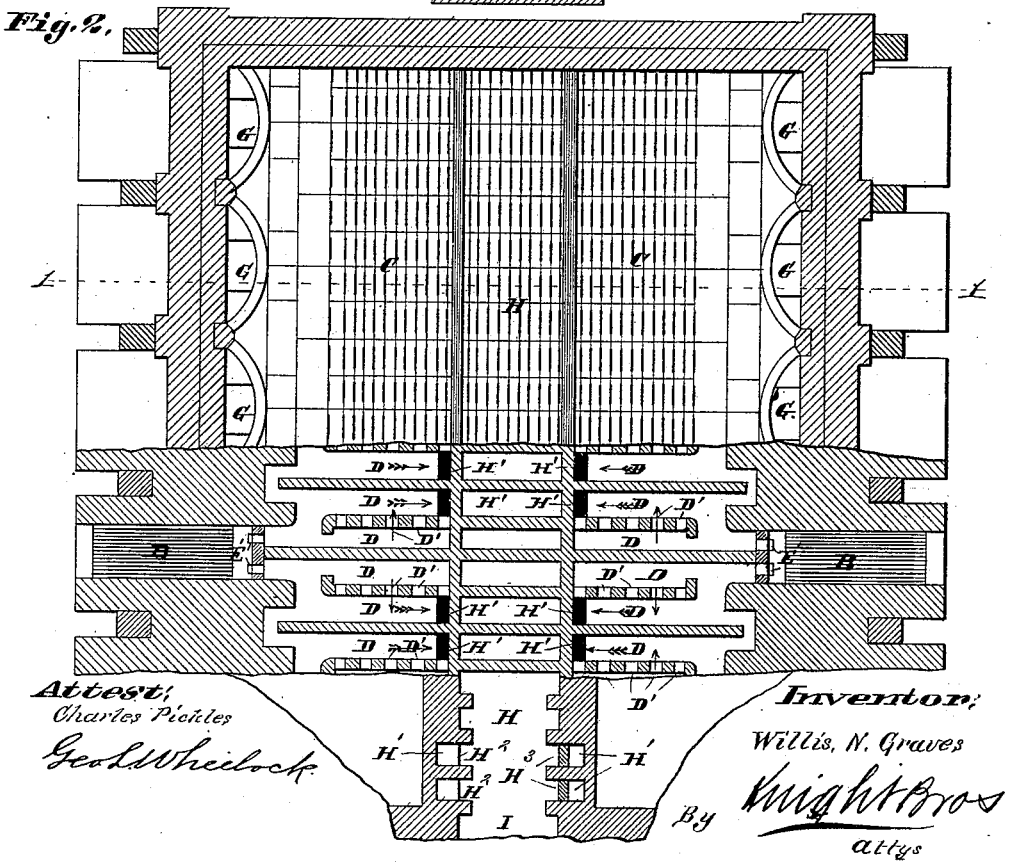

Figure 1 is a vertical section of my improved kiln, taken on line 1 1, Fig. 2. Fig. 2 is a horizontal section with part of the flues, floor, and furnace-tops broken away.

My present invention relates to certain improvements on the kiln shown and described in Letters Patent of the United States No. 294,223, issued to myself and assignee (Hydraulic Press Brick Company) the 26th day of February, 1884; and this invention consists in features of novelty hereinafter fully described, and pointed out in the claims.

The reference-letters used in said patent are used in this application to denote the same parts of the kiln, A representing the brick-chamber, B the furnaces, C the perforated floor, D the horizontal flues beneath the floor, E the openings formed by the walls F, G the side flues, H the central flue, and I the chimney, all arranged and operating the same as in the kiln represented in the patent referred to, the general construction and operation of the two being the same; and a further description here is unnecessary, so I will at once proceed to describe the parts of the kiln to which my present invention relates.

In drying the bricks before the burning commences better satisfaction is found to be obtained from an all-down or all-up draft than from a down and up combined, and to provide for this in this form of kiln I form flues H' outside the flue H and beneath the horizontal flues D, which communicate with the flue H by openings $H^2$, which are stopped during the burning process by plugs $H^3$. There should be an opening, $H^2$, for each flue D unless, as I have shown and prefer to do in practice, openings D' are made in the short walls of the flues, and then only half the number of openings $H^2$ are required. The drying-heat, if the furnaces B are used for this purpose, passes up the flues G, (the openings E being closed,) down through the perforated floor, and into the flue H, as indicated by the arrows in Fig. 1. If the heat from another kiln is used for drying, it passes through the opening A' in the top of the kiln and down through the perforated floor into the flue H, as in the other case, the doors to furnaces B being closed; or the course of the heat could be reversed and pass in through the flue H and H', up through the perforated floor, and out through the openings A'. When the drying process is finished, the openings $H^2$ are closed and the kiln operates the same as in said patent, and as though the flues H' did not exist.

It has been found in practice that the bricks in the part indicated by the letters P of the chamber A become overheated in burning and acquire a bad color. This is caused by the exclusion of oxygen from the heat passing from the furnaces through the openings E, all the air entering through the furnace-doors passing over the fires and up the flues G. To overcome this difficulty I make flues E' behind the bridge-walls of the furnaces, which form communications between the ash-pits and the furnaces just in front of the walls F, and the air or oxygen passing through these flues gets behind and is carried by the heat into the flues D through the openings E, having the effect of decreasing the temperature and preventing the discoloring of the bricks, as above mentioned.

I am, of course, aware that hollow bridge-walls in furnaces are old and well known, and I do not make any claim thereto except when used in a kiln as and for the purpose specified.

I claim as my invention—

1. In a brick-kiln having vertical side flues and horizontal flues beneath the floor of the kiln, the furnaces communicating with said flues, in combination with flues located behind the bridge-walls of the furnaces, substantially as and for the purpose set forth.

2. In a brick-kiln having furnaces, a floor and flues located beneath the floor and communicating with the furnaces, the flues located behind the bridge-walls of the furnaces, substantially as shown and described, for the purpose specified.

3. The combination, with the chamber A, the furnace B, and the passages E, placing the lower part of said chamber in communication with the said furnace, of the flue E', discharging cold or partially-heated air into the current of highly-heated air as it passes from the furnace to the chamber, substantially as and for the purposes set forth.

4. The combination, with the chamber A, having the perforated floor C and the flues D located thereunder, of the furnaces B, the passages E, connecting said flues and furnaces, and the flues E', discharging cold or slightly-heated air at the openings E, as and for the purposes set forth.

5. The combination of the chamber A, the floor C, the flues D beneath said floor, communicating with said chamber, the exit-flue H, also beneath said floor, the chimney I, with which it communicates, and the flues H', connecting said flues D and H, substantially as and for the purpose set forth.

6. The combination, with the chamber A, having the perforated floor C and openings above said floor for the ingress of air, of the flues D and exit-flue H, located beneath said floor, and the flues H', connecting said flues, provided with stoppers $H^2$, substantially as and for the purpose set forth.

WILLIS N. GRAVES.

In presence of—
   GEO. H. KNIGHT,
   SAML. KNIGHT.